(12) United States Patent
Uchida et al.

(10) Patent No.: US 10,690,640 B2
(45) Date of Patent: Jun. 23, 2020

(54) ANALYSIS METHOD FOR MYCOTOXINS

(71) Applicant: Shimadzu Corporation, Kyoto (JP)

(72) Inventors: Azusa Uchida, Kyoto (JP); Natsuki Iwata, Kyoto (JP); Minori Nakashima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 198 days.

(21) Appl. No.: 15/754,420

(22) PCT Filed: Aug. 28, 2015

(86) PCT No.: PCT/JP2015/074523
§ 371 (c)(1),
(2) Date: Feb. 22, 2018

(87) PCT Pub. No.: WO2017/037802
PCT Pub. Date: Mar. 9, 2017

(65) Prior Publication Data
US 2018/0238844 A1    Aug. 23, 2018

(51) Int. Cl.
*G01N 30/74* (2006.01)
*G01N 30/78* (2006.01)
(Continued)

(52) U.S. Cl.
CPC ............ *G01N 30/74* (2013.01); *G01N 21/64* (2013.01); *G01N 30/48* (2013.01); *G01N 30/78* (2013.01);
(Continued)

(58) Field of Classification Search
CPC .. B01D 15/08; B01D 11/0403; G01N 30/461; G01N 30/74; G01N 30/14
(Continued)

(56) References Cited

U.S. PATENT DOCUMENTS 9,512,461 B1 * 12/2016 Beck .................. C12Q 1/04
2005/0100959 A1 * 5/2005 Sinbanda ............ G01N 30/14
435/7.1
(Continued)

FOREIGN PATENT DOCUMENTS

JP    H01-244342 A    9/1989
JP    2004-233229 A   8/2004
(Continued)

OTHER PUBLICATIONS

Office Action dated Jun. 6, 2019, in corresponding Chinese Application No. 201580081957.6 including machine-generated English language translation; 18 pages.
(Continued)

*Primary Examiner* — Clayton E. LaBalle
*Assistant Examiner* — Kevin C Butler
(74) *Attorney, Agent, or Firm* — Maier & Maier, PLLC

(57) ABSTRACT

An analysis method for mycotoxins including a separation step, a detection step, and an identification step. In the separation step, each component contained in a liquid sample is separated in a column In the detection step, components separated in the separation step are detected by a PDA and a fluorescence detector. In the identification step, total aflatoxin is identified based on a detection signal from the fluorescence detector, and deoxynivalenol is identified based on a detection signal from the PDA.

5 Claims, 3 Drawing Sheets

(51) Int. Cl.
  G01N 21/64     (2006.01)
  B01J 20/281    (2006.01)
  G01N 30/88     (2006.01)
  G01N 30/02     (2006.01)
  G01N 30/00     (2006.01)

(52) U.S. Cl.
  CPC . *G01N 2030/027* (2013.01); *G01N 2030/488* (2013.01); *G01N 2030/884* (2013.01)

(58) Field of Classification Search
  USPC .......................................................... 73/61.53
  See application file for complete search history.

(56) References Cited

U.S. PATENT DOCUMENTS

| | | | |
|---|---|---|---|
| 2007/0048787 A1* | 3/2007 | Zabe | B01J 20/28052 435/7.1 |
| 2007/0117218 A1* | 5/2007 | Zabe | B01D 15/3809 436/514 |
| 2007/0117219 A1* | 5/2007 | Zabe | B01D 15/3809 436/514 |
| 2018/0238844 A1* | 8/2018 | Uchida | G01N 30/74 |

FOREIGN PATENT DOCUMENTS

| | | | | |
|---|---|---|---|---|
| JP | 2004233229 | * | 8/2004 | ............ G01N 30/24 |
| JP | 2012-220401 A | | 11/2012 | |
| JP | 2013-83479 A | | 5/2013 | |
| JP | 2015-25680 A | | 2/2015 | |

OTHER PUBLICATIONS

F. Soleimany et al.; "Simultaneous detection of 12 mycotoxins in cereals using RP-HPLC-PDA-FLD with PHRED and post-column derivatization system"; Food Additives & Contaminants: Part A: Chemistry, Analysis, Control, Exposure & Risk Assessment; vol. 28; No. 4; Apr. 2011; pp. 494-501. Downloaded by [Unviersity of Guelph] Jul. 14, 2012.

S. Moreau et al.; "Highly sensitive and rapid simultaneous method for 45 mycotoxins in baby food samples by HPLC-MS/MS using fast polarity switching"; SHIMADZU Excellence in Science; PO-CON1480E; Jun. 2014; 7 pages.

Li Rui et al.; "High Performance Liquid Chromatography Simultaneous Determination of 8 Kinds of Mycotoxins in Food"; Food Science; vol. 36; No. 6; pp. 206-210; 2015; 15 pages including machine-generated English language translation.

International Search Report dated Oct. 27, 2015 of corresponding International Application No. PCT/JP2015/074523; 5 pgs.

"Simultaneous analysis method of 13 types of mycotoxins by Agilent 6410", Application Note, LCMS-200807TK-002, Agilent Technologies, Jul. 2008.

Etsuko Isohata et al., "Simultaneous Analysis of Several Mycotoxins in Grains by High-performance Liquid Chromatograhy", Journal of Japanese Society for Food Science and Technology, vol. 39, No. 7, The Japanese Society for Food Science and Technology, 1992, pp. 632 to 640; with English Abstract.

Japanese Office Action dated Nov. 20, 2018, in connection with corresponding JP Application No. 2017-537068 (8 pgs., including machine-generated English translation).

The extended European search report dated Mar. 14, 2019, in corresponding European patent application No. 15902925.5; 6 pages.

* cited by examiner

ANALYSIS METHOD FOR MYCOTOXINS

FIELD

The present invention relates to an analysis method for mycotoxins produced in food, drink and the like.

BACKGROUND

For example, mycotoxins, which are poisonous to humans and animals, are sometimes produced in food, drink and the like. Mycotoxins are compounds, among secondary metabolites produced by mold, that cause health damage to humans or animals, and various methods are proposed as analysis methods for mycotoxins (for example, see Patent Document 1). Particularly, aflatoxin, which is a type of mycotoxin, is known as one of substances that are most carcinogenic among natural substances, and is strictly regulated in many countries and regions around the world.

With respect to grain such as wheat, mycotoxins such as ochratoxin, zearalenone, and trichothecene (deoxynivalenol, nivaleonol) may be produced in addition to four components (B1, B2, G1, G2) among five components (B1, B2, G1, G2, M1) of aflatoxin. The four components B1, B2, G1, G2 among the five components of aflatoxin are referred to as total aflatoxin.

A separate analysis method is established for each of components of mycotoxin as mentioned above. For example, as an analysis method for total aflatoxin, a method of analyzing a liquid sample by using a high performance liquid chromatograph provided with a fluorescence detector or a mass spectrometer is announced by the Ministry of Health, Labour and Welfare and the Codex Alimentarius Commission. Furthermore, as an analysis method for deoxynivalenol, a method of analyzing a liquid sample by using a high performance liquid chromatograph provided with an ultraviolet spectrophotometer detector is likewise announced by the Ministry of Health, Labour and Welfare and the Codex Alimentarius Commission.

Patent Document 1: JP 2015-25680 A

SUMMARY

The analysis methods for respective components of mycotoxin are performed under different conditions. Accordingly, in the case of performing an analysis of a plurality of types of components, the analysis has to be performed several times by changing the conditions, and the task is burdensome.

Furthermore, the analysis method for each component of mycotoxin is a method which is capable of not only identification but also quantification of the component in a liquid sample. Accordingly, even in a case where it is enough if whether each component of mycotoxin is contained in the liquid sample or not is checked, a detailed analysis has to be performed to quantify each component, and there is a problem that the task takes a long time.

The present invention has been made in view of the above circumstances, and has its object to provide an analysis method for mycotoxins which allows presence/absence of a plurality of components of mycotoxin in a liquid sample to be easily checked in a short time.

(1) An analysis method for mycotoxins according to the present invention includes a separation step, a detection step, and an identification step. In the separation step, each component contained in a liquid sample is separated in a column. In the detection step, components separated in the separation step are detected by at least two detectors. In the identification step, each component is identified based on a detection result of the detection step. The at least two detectors include a fluorescence detector. In the identification step, total aflatoxin is identified based on a detection signal from the fluorescence detector, and deoxynivalenol is identified based on a detection signal from a detector other than the fluorescence detector.

According to such a configuration, identification of total aflatoxin and deoxynivalenol may be performed in one analysis based on the detection signals from the at least two detectors. Even if total aflatoxin content is low, total aflatoxin may be desirably identified based on the detection signal from the fluorescence detector, which is highly sensitive. Furthermore, deoxynivalenol may be separated from total aflatoxin, and may be desirably identified based on the detection signal from the detector other than the fluorescence detector Presence/absence of a plurality of components (total aflatoxin and deoxynivalenol) of mycotoxin in a liquid sample may thus be checked in one analysis. Accordingly, compared to a case of performing a plurality of analyses by changing the conditions on a per component basis, presence/absence of a plurality of components of mycotoxin in a liquid sample may be easily checked in a short time.

(2) The at least two detectors may include a photodiode array detector. In this case, in the identification step, deoxynivalenol may be identified based on a detection signal from the photodiode array detector.

According to such a configuration, a relationship between a wavelength and absorbance may be obtained as a spectrum based on the detection signal from the photodiode array detector. Accordingly, by comparing the obtained spectrum against a spectrum library created in advance, various components such as deoxynivalenol may be desirably identified.

(3) In the detection step, a wavelength of fluorescence to be detected by the fluorescence detector may be switched at a timing set in advance.

According to such a configuration, total aflatoxin may be desirably identified by detecting fluorescence at a specific wavelength by the fluorescence detector, and also, a different component may be desirably detected based on a detection signal from the fluorescence detector by switching the wavelength of fluorescence to be detected by the fluorescence detector. Accordingly, presence/absence of a greater number of components in a liquid sample may be checked.

(4) In the separation step, a mixed liquid of a buffer and an organic solvent may be supplied as a mobile phase to the column.

According to such a configuration, because a mixed liquid of a buffer and an organic solvent is used as the mobile phase, total aflatoxin and deoxynivalenol may be desirably separated in the process of the liquid sample passing through the column. Accordingly, presence/absence of total aflatoxin and deoxynivalenol in the liquid sample may be checked with a higher accuracy.

(5) In the separation step, the mixed liquid may be supplied as the mobile phase to the column with a mixing ratio of the organic solvent in the mixed liquid being increased over time.

According to such a configuration, the mixing ratio of the organic solvent in the mixed liquid that is supplied to the column as the mobile phase is increased over time, and thus, total aflatoxin and deoxynivalenol may be even more desirably separated in the process of the liquid sample passing through the column. Accordingly, presence/absence of total aflatoxin and deoxynivalenol in the liquid sample may be checked with an even higher accuracy.

According to the present invention, presence/absence of a plurality of components (total aflatoxin and deoxynivalenol) of mycotoxin in a liquid sample may be checked in one analysis, in a short time and with ease.

DETAILED DESCRIPTION OF THE DRAWINGS

1. Configuration of Liquid Chromatograph

Figure 1:
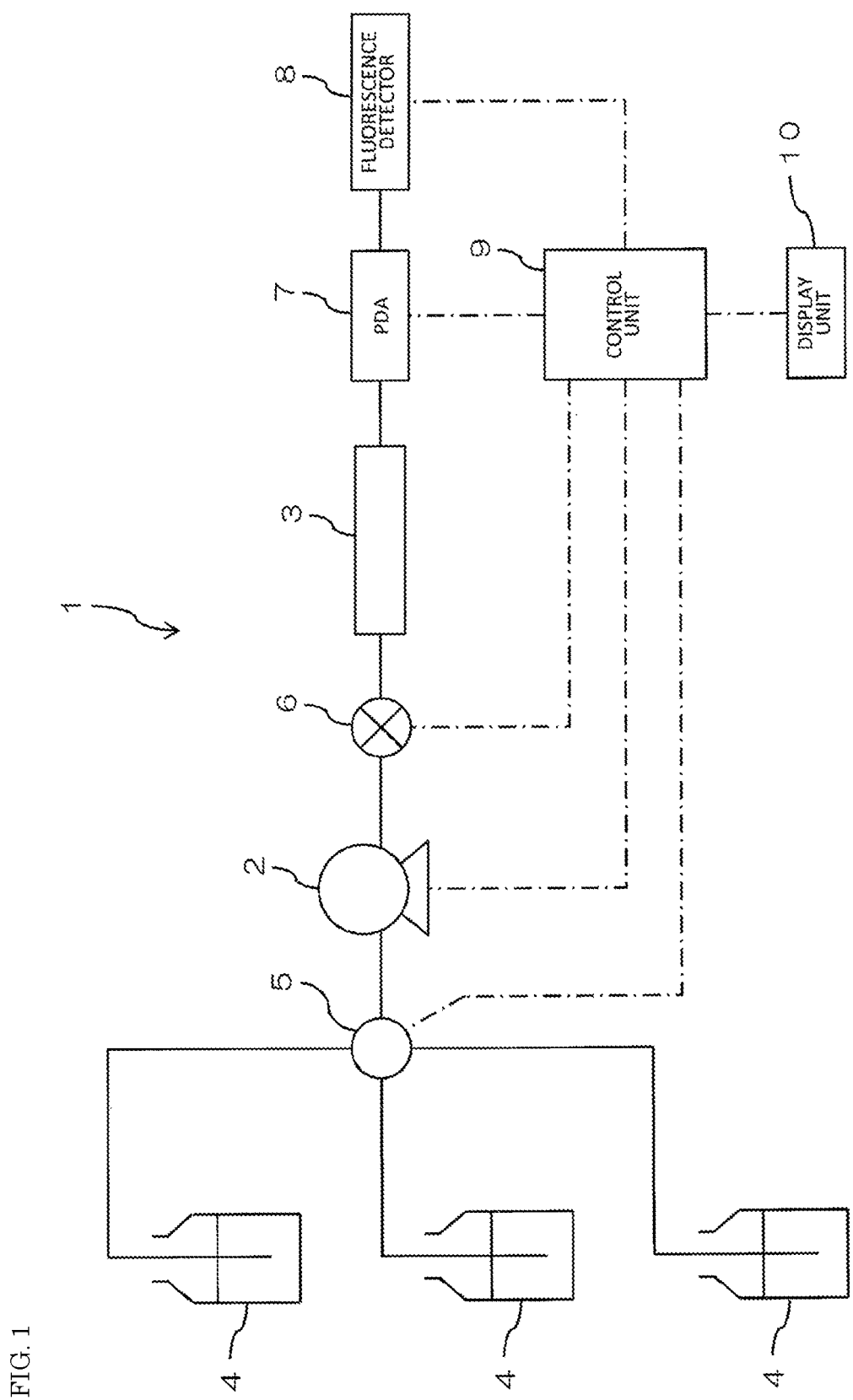
FIG. 1 is a block diagram showing an example configuration of a liquid chromatograph which is used in an analysis method according to an embodiment of the present invention.

FIG. 1 is a block diagram showing an example configuration of a liquid chromatograph 1 which is used in an analysis method according to an embodiment of the present invention. The liquid chromatograph 1 is a high performance liquid chromatograph (HPLC), and introduces a liquid sample into a column 3 while supplying a mobile phase into the column 3 by using a pump 2, and each component in the liquid sample is separated in the process of the liquid sample passing through the column 3.

In addition to the pump 2 and the column 3 mentioned above, the liquid chromatograph 1 includes a plurality of mobile phase containers 4, a mixer 5, an injector 6, a photodiode array detector (PDA) 7, a fluorescence detector 8, a control unit 9, and a display unit 10, for example.

Different mobile phases are contained in the plurality of mobile phase containers 4. As the mobile phases, buffers and organic solvents are used, for example. A buffer may be, but is not limited to, an aqueous solution of sodium phosphate, and can contain another phosphate, or can be a solution, other than phosphate, having a buffer function. Furthermore, organic solvents may be, but are not limited to, acetonitrile and methanol.

In this example, three mobile phase containers 4 containing sodium phosphate buffer, acetonitrile, and methanol, respectively, are provided. The mobile phases contained in these mobile phase containers 4 are mixed at the mixer 5 at a set mixing ratio, and are delivered by the pump 2 to the column 3. For example, the column 3 is a reverse phase column, and a C18 column which takes silica gel, the surface of which is modified by octadecylsilyl (ODS), as a stationary phase may be cited as an example, although this is not restrictive.

The injector 6 injects a liquid sample as an analysis target into a mobile phase that is delivered from the pump 2 to the column 3, by using a micro-syringe or the like. Each component contained in the liquid sample is separated in the process of passing through the column 3 together with the mobile phase (separation step), and is detected by the PDA 7 and the fluorescence detector 8 provided on the downstream of the column 3 (detection step). In this manner, in the present embodiment, each separated component in a liquid sample is detected by two detectors 7, 8.

The pump 2, the mixer 5, the injector 6, the PDA 7, and the fluorescence detector 8 are each electrically connected to the control unit 9. The control unit 9 controls the operation of the pump 2, the mixer 5, and the injector 6 based on set analysis conditions. In the present embodiment, a gradient analysis is performed by performing an analysis while changing the mixing ratio of a plurality of mobile phases at the mixer 5 over time.

The control unit 9 causes detection results to be displayed on the display unit 10, based on detection signals from the PDA 7 and the fluorescence detector 8. The display unit 10 is a liquid crystal display, for example, and an operator is enabled to identify each component in the liquid sample based on the detection results displayed on the display unit 10 (identification step).

Absorbance at respective wavelength may be obtained as a spectrum based on the detection signal from the PDA 7, and a temporal change in the spectrum may be obtained as three-dimensional data having time, wavelength, and absorbance as three axes. Accordingly, if a spectrum library is created in advance for a target component, the target component may be identified by determining the degree of coincidence between the spectrum library and a spectrum obtained by an analysis.

The fluorescence detector 8 excites a component in the liquid sample by using excitation light at a specific excitation wavelength so as to cause the component to fluoresce, and detects fluorescence at a specific fluorescence wavelength. The excitation wavelength and the fluorescence wavelength can be switched, and a plurality of components at different excitation wavelengths and fluorescence wavelengths may be detected in one analysis by switching these wavelengths at appropriate timings.

2. Operation of Liquid Chromatograph during Analysis

Figure 2:
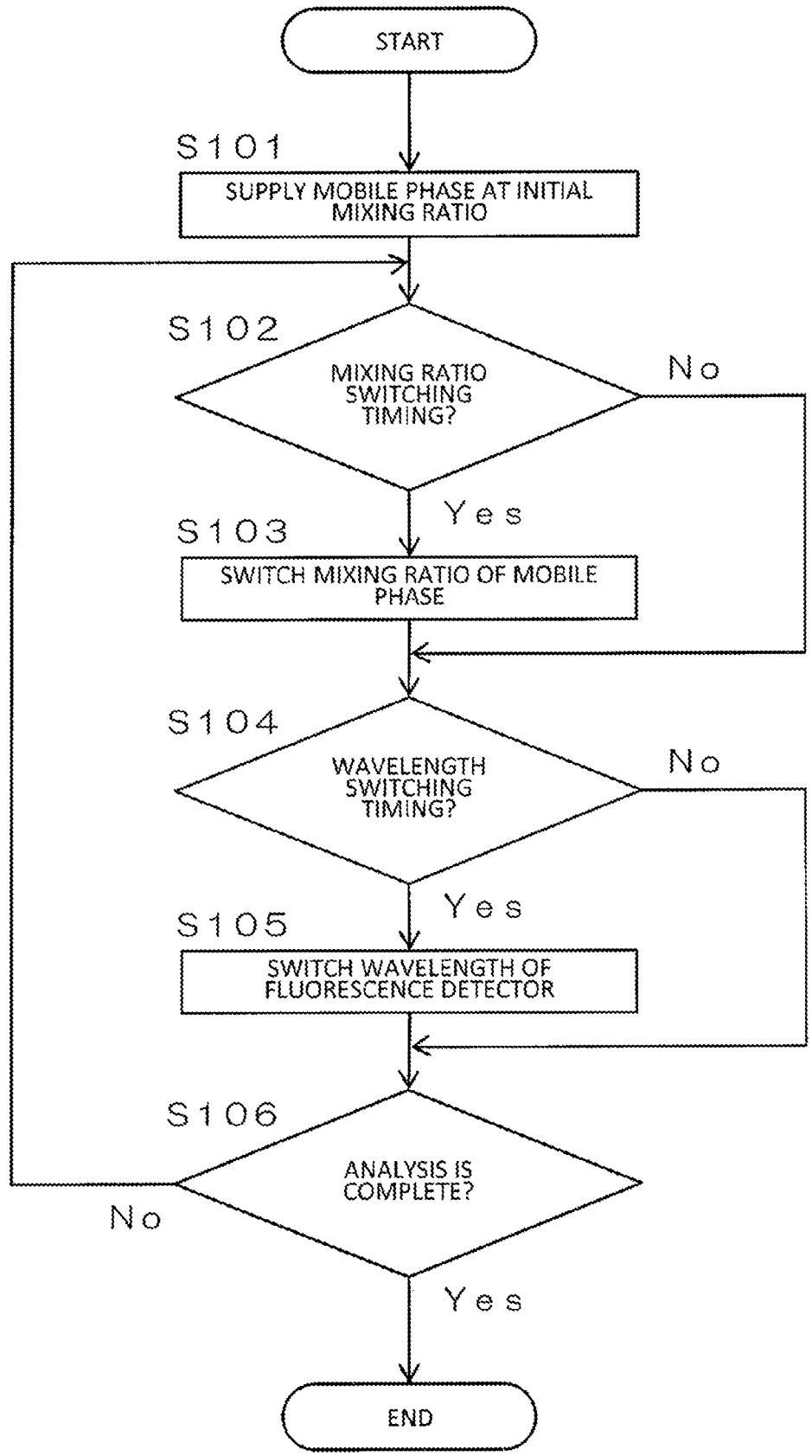
FIG. 2 is a flowchart showing an example of a process by a control unit during an analysis.

FIG. 2 is a flowchart showing an example of a process by the control unit 9 during an analysis. During an analysis, the control unit 9 controls operation of each unit based on analysis conditions set in advance, and detection signals from the PDA 7 and the fluorescence detector 8 are thus acquired simultaneously in parallel.

During an analysis, the control unit 9 first causes the mobile phases in respective mobile phase containers 4 to be mixed at a mixing ratio which is set in advance as an initial mixing ratio, and causes the mixed liquid to be continuously supplied to the column 3 (step S101). Then, the control unit 9 monitors as to whether a timing for switching the mixing ratio of the mobile phases is reached or not (step S102), and as to whether a timing for switching the wavelengths of the fluorescence detector 8 is reached or not (step S104).

Then, when a timing set in advance as the timing for switching the mixing ratio of the mobile phases is reached (step S102: Yes), the control unit 9 switches to a mixing ratio set in advance as the mixing ratio at the timing (step S103). Accordingly, a mixed liquid mixed at the mixing ratio after switching is continuously supplied to the column 3 until the next timing for switching the mixing ratio of the mobile phases is reached.

In the present embodiment, the control unit 9 switches the mixing ratio of the mobile phases at a plurality of timings. Specifically, every time the timing for switching the mixing ratio of the mobile phases is reached (step S102: Yes), the control unit 9 switches the mixing ratio (step S103), and causes the mobile phase to be supplied to the column 3 while increasing the mixing ratio of the organic solvent in the mixed liquid over time.

On the other hand, when a timing set in advance as the timing for switching the excitation wavelength and the fluorescence wavelength of the fluorescence detector 8 is reached (step S104: Yes), the control unit 9 switches wavelengths (excitation wavelength and fluorescence wavelength) of the fluorescence detector 8 to wavelengths set in advance (step S105). Accordingly, components in the liquid sample are excited by excitation light at different wavelengths, and a component corresponding to a wavelength is caused to fluoresce, and also, the wavelength of fluorescence to be detected by the fluorescence detector 8 is switched so that the fluorescence may be detected.

3. Identification of Each Component in Liquid Sample

When the gradient analysis as described above is completed (step S106: Yes), chromatograms as detection results are displayed on the display unit 10 based on the detection signals from the PDA 7 and the fluorescence detector 8. A chromatogram based on the detection signal from the PDA 7 and a chromatogram based on the detection signal from the fluorescence detector 8 are separately displayed on the display unit 10, and an operator identifies each component in the liquid sample by using the chromatograms At this time, the operator identifies deoxynivalenol in the liquid sample by using the chromatogram based on the detection signal from the PDA 7. Furthermore, the operator identifies total aflatoxin in the liquid sample by using the chromatogram based on the detection signal from the fluorescence detector 8.

Identification of deoxynivalenol is performed by using a chromatogram at each wavelength based on the detection signal from the PDA 7, that is, three-dimensional data having time, wavelength, and absorbance as three axes. Specifically, a spectrum showing a relationship between a wavelength and absorbance at each peak is compared against a spectrum library for a target component (deoxynivalenol) created in advance and the degree of coincidence is determined, and whether a peak is the peak of the target component is determined based on the determined degree of coincidence. Spectra for other various components (nivaleonol, patulin, etc.) classified as mycotoxins, in addition to deoxynivalenol, are registered in the spectrum library.

Identification of total aflatoxin is performed by determining presence/absence of a peak at a specific fluorescence wavelength which is detected by the fluorescence detector 8. Specifically, a retention time of each component of total aflatoxin determined from a standard sample and a retention time of each peak determined from a liquid sample which is an analysis target are compared against each other, and presence/absence of each component of total aflatoxin in the liquid sample is determined.

4. Effects (1) In the present embodiment, identification of total aflatoxin and deoxynivalenol may be performed in one analysis based on the detection signals from the PDA 7 and the fluorescence detector 8. Even if total aflatoxin content is low, total aflatoxin may be desirably identified based on the detection signal from the fluorescence detector 8, which is highly sensitive. Furthermore, deoxynivalenol may be desirably identified by being separated from total aflatoxin, and by comparing a spectrum obtained based on the detection signal from the PDA 7 against the spectrum library which is created in advance.

Presence/absence of a plurality of components (total aflatoxin and deoxynivalenol) of mycotoxin in a liquid sample may thereby be checked in one analysis. Accordingly, compared to a case of performing a plurality of analyses by changing the conditions on a per component basis, presence/absence of a plurality of components of mycotoxin in a liquid sample may be easily checked in a short time.

(2) Furthermore, in the present embodiment, total aflatoxin may be desirably identified by detecting fluorescence at a specific wavelength by the fluorescence detector 8, and also, another component such as zearalenone or ochratoxin may be desirably detected based on a detection signal from the fluorescence detector 8 by switching the wavelength of fluorescence to be detected by the fluorescence detector 8 (steps S104 and S105 in FIG. 2). Accordingly, presence/absence of a greater number of components in a liquid sample may be checked.

(3) Furthermore, in the present embodiment, because a mixed liquid of a buffer and an organic solvent is used as the mobile phase, total aflatoxin and deoxynivalenol may be desirably separated in the process of the liquid sample passing through the column 3. Accordingly, presence/absence of total aflatoxin and deoxynivalenol in the liquid sample may be checked with a higher accuracy.

(4) Moreover, in the present embodiment, the mixing ratio of an organic solvent in a mixed liquid which is supplied to the column 3 as the mobile phase is increased over time (steps S102 and S103 in FIG. 2), and thus, total aflatoxin and deoxynivalenol may be even more desirably separated in the process of the liquid sample passing through the column 3. Accordingly, presence/absence of total aflatoxin and deoxynivalenol in the liquid sample may be checked with an even higher accuracy.

5. Example

In the following, a result of performing screening of presence/absence of each component of mycotoxin in a liquid sample by the liquid chromatograph 1 according to the embodiment described above is described. Target components of screening are five components (B1, B2, G1, G2, M1) of aflatoxin, nivaleonol, deoxynivalenol, ochratoxin, zearalenone, and patulin.

As the liquid chromatograph 1, "Nexera-i 3D" (product of Shimadzu Corporation) provided with the PDA 7 is used, and "RF-20Axs" (product of Shimadzu Corporation) is added as the fluorescence detector 8. Furthermore, as the column 3, "Shim-pack GIST" (product of Shimadzu Corporation), which is a reverse phase column, is used. The stationary phase in the column 3 is C18, and the length, the inner diameter, and the packing material particle diameter of the column 3 are 50 cm, 3.0 mm, and 2 μm, respectively.

As the mobile phases, a sodium phosphate buffer, acetonitrile, and methanol are used. With respect to the sodium phosphate buffer, the concentration of phosphoric acid is 20 mmol/L, and pH is 2.5. The flow rate of the mobile phase in the column 3 is 1.0 mL/min, the temperature of the column 3 is 55° C., and the amount of injection of a liquid sample from the injector 6 is 5 μL. Additionally, the temperature of the column 3 is set to a higher temperature than for a general analysis from the standpoint of reducing the analysis time, and is desirably set in the range of 50° C. to 80° C., for example.

A temporal change in the mixing ratio of each mobile phase in the gradient analysis is as follows.

Sodium phosphate buffer: 90% (0.00-0.50 min)→70% (0.51 min)→60% (2.65 min)→50% (2.66-5.10 min)→90% (5.11-7.00 min)

Acetonitrile: 10% (0.00-0.50 min)→15% (0.51-2.65 min) →35% (2.66-5.10 min)→10% (5.11-7.00 min)

Methanol: 0% (0.00-0.50 min)→15% (0.51 min)→25% (2.65 min)→15% (2.66-5.10 min)→0% (5.11-7.00 min)

Wavelengths in two channels of 220 nm for nivaleonol and deoxynivalenol, and 276 nm for patulin are detected by the PDA 7. At the fluorescence detector 8, a period (0.00-4.29 min) when a fluorescence wavelength at 450 nm is detected at an excitation wavelength at 365 nm for the five components of aflatoxin is switched to a period (4.30-7.00 min) when a fluorescence wavelength at 465 nm is detected at an excitation wavelength at 320 nm for ochratoxin and zearalenone.

Figure 3A:
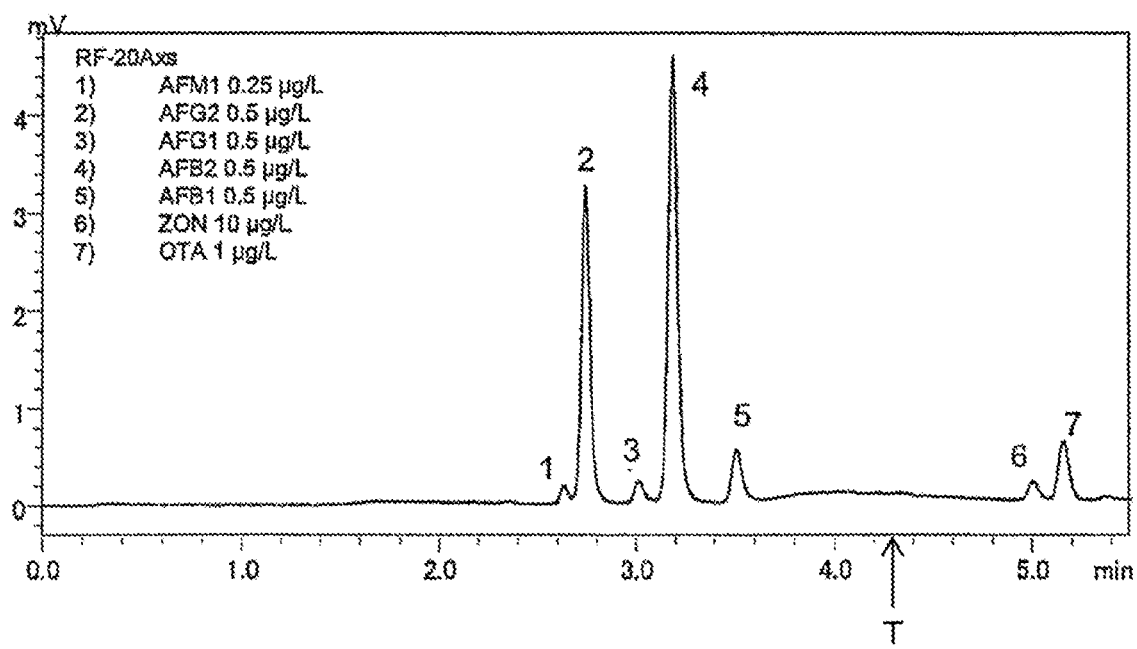
FIG. 3A is a chromatogram obtained from detection signals of a fluorescence detector in an Example.
Figure 3B:
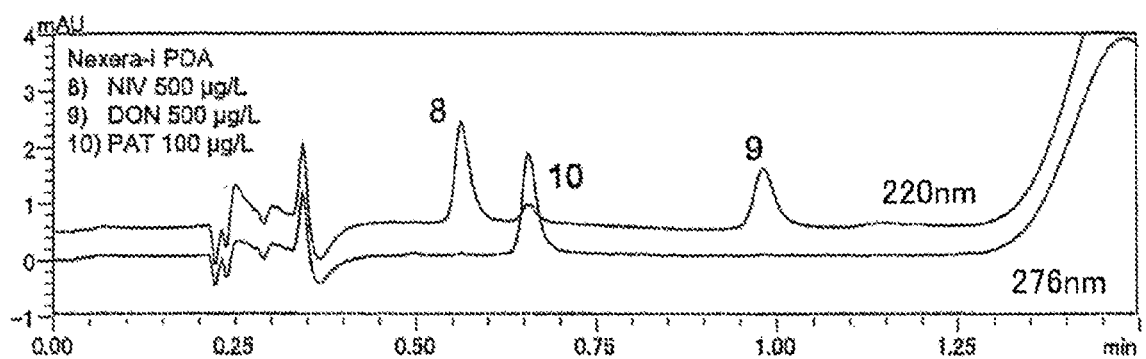
FIG. 3B is a chromatogram obtained from detection signals of a PDA in the Example.

FIG. 3A is a chromatogram obtained from detection signals of the fluorescence detector 8 in an Example. FIG. 3B is a chromatogram obtained from detection signals of the PDA 7 in the Example. These chromatograms are obtained by one analysis simultaneously in parallel, and peaks of different target components are present.

Peaks of five components (AFB1, AFB2, AFG1, AFG2, AFM1) of aflatoxin, ochratoxin (OTA), and zearalenone (ZON) are present in the chromatogram in FIG. 3A. In this manner, the total aflatoxin may be identified based on the detection signal from the fluorescence detector 8. Additionally, in the chromatogram in FIG. 3A, the excitation wavelength and the fluorescence wavelength are switched at a timing T at 4.30 min.

Furthermore, in the chromatogram in FIG. 3B, peaks of nivaleonol (NIV) and deoxynivalenol (DON) appear at a wavelength 220 nm, and a peak of patulin (PAT) appears at a wavelength 276 nm. In this manner, deoxynivalenol may be identified based on the detection signal from the PDA 7.

In the examples in FIGS. 3A and 3B, a long retention time component is identified based on the detection signal from the fluorescence detector 8 (see FIG. 3A), and a short retention time component is identified based on the detection signal from a detector (PDA 7) other than the fluorescence detector 8 (see FIG. 3B). As shown in FIGS. 3A and 3B, the time until each target component is detected is 5 to 6 minutes, and screening can be performed in a short time.

6. Modification

The embodiment above describes an analysis method for mycotoxins according to which total aflatoxin is identified based on a detection signal from the fluorescence detector 8, and deoxynivalenol is identified based on a detection signal from the PDA 7. However, such a method is not restrictive, and deoxynivalenol may be identified based on a detection signal from a detector other than the PDA 7, for example. Moreover, identification of total aflatoxin and deoxynivalenol may be performed not by a configuration which uses two detectors of the PDA 7 and the fluorescence detector 8, but based on detection signals from three or more detectors including the fluorescence detector 8. Moreover, the order of arrangement of the detectors is not limited to the order shown in FIG. 1.

The invention claimed is:

1. An analysis method for mycotoxins comprising:
 a separation step of separating, in a column, total aflatoxin, deoxynivalenol, nivaleonol and patulin contained in a liquid sample, by using a mixed liquid of a buffer and an organic solvent including acetonitrile and methanol as a mobile phase, and supplying the mobile phase to the column with a mixing ratio of acetonitrile and methanol in the mobile phase being increased over time;
 a detection step of detecting components separated in the separation step by at least two detectors under same analysis condition; and
 an identification step of identifying each component based on a detection result of the detection step, wherein
 the at least two detectors include a fluorescence detector, and
 in the identification step, based on one result of the detection step under the same analysis condition, total aflatoxin is identified based on a detection signal from the fluorescence detector, and deoxynivalenol, nivaleonol and patulin are identified based on a detection signal from a detector other than the fluorescence detector.

2. The analysis method for mycotoxins according to claim 1, wherein
 the at least two detectors include a photodiode array detector, and
 in the identification step, deoxynivalenol, nivaleonol and patulin are identified based on a detection signal from the photodiode array detector.

3. The analysis method for mycotoxins according to claim 2, wherein identification of deoxynivalenol, nivaleonol and patulin is performed by comparing a spectrum showing a relationship between a wavelength and absorbance at each peak of chromatogram based on the detection signal from the photodiode array detector against each spectrum library for deoxynivalenol, nivaleonol and patulin created in advance, and determining the degree of coincidence, and determining based on the determined degree of coincidence.

4. The analysis method for mycotoxins according to claim 1, wherein, in the detection step, a wavelength of fluorescence to be detected by the fluorescence detector is switched at a timing set in advance.

5. An analysis method for mycotoxins comprising:
 a separation step of separating, in a column, each component contained in a liquid sample;
 a detection step of detecting components separated in the separation step by at least two detectors under same analysis condition; and
 an identification step of identifying each component based on a detection result of the detection step, wherein
 the at least two detectors include a fluorescence detector and a photodiode array detector,
 in the identification step, based on one result of the detection step under the same analysis condition, total aflatoxin is identified based on a detection signal from the fluorescence detector, and deoxynivalenol, nivaleonol and patulin are identified based on a detection signal from the photodiode array detector, and
 identification of deoxynivalenol, nivaleonol and patulin is performed by comparing a spectrum showing a relationship between a wavelength and absorbance at each peak of chromatogram based on the detection signal from the photodiode array detector against each spectrum library for deoxynivalenol, nivaleonol and patulin created in advance, and determining the degree of coincidence, and determining based on the determined degree of coincidence.

* * * * *